United States Patent [19]
Kanemori et al.

[11] Patent Number: 5,469,025
[45] Date of Patent: Nov. 21, 1995

[54] FAULT TOLERANT ACTIVE MATRIX DISPLAY DEVICE

[75] Inventors: Yuzuru Kanemori, Tenri; Mikio Katayama, Ikoma; Kiyoshi Nakazawa, Fujiidera; Naofumi Kondo, Nara; Masaya Okamoto, Nara; Hiroaki Kato, Nara; Kozo Yano, Yamatokoriyama; Katsumi Irie, Gojo; Kumiko Otsu, Osaka; Hiroshi Fujiki, Sakai; Toshiaki Fujihara, Tenri; Hideji Marumoto, Kitakatsuragi; Hidenori Negoto, Ikoma; Kazuyori Mitsumoto, Tenri, all of Japan

[73] Assignee: Sharp Kabushiki Kaisha, Japan

[21] Appl. No.: 408,183

[22] Filed: Mar. 22, 1995

Related U.S. Application Data

[63] Continuation of Ser. No. 48,061, Apr. 19, 1993, abandoned, which is a continuation of Ser. No. 706,974, May 29, 1991, abandoned.

[30] Foreign Application Priority Data

Sep. 27, 1990 [JP] Japan ................................. 2-259447
Sep. 28, 1990 [JP] Japan ................................. 2-261477
Feb. 21, 1991 [JP] Japan ................................. 3-027530
Feb. 21, 1991 [JP] Japan ................................. 3-027531

[51] Int. Cl.⁶ .................................................. H05B 37/02
[52] U.S. Cl. ........................... 315/169.3; 359/55; 359/59
[58] Field of Search ............................. 359/55, 59, 87; 313/583; 340/784 BI, 784 CI; 315/169.3, 169.4

[56] References Cited

U.S. PATENT DOCUMENTS 4,431,271  2/1984  Okubo .................................. 359/59

(List continued on next page.)

FOREIGN PATENT DOCUMENTS 0288011  4/1988  European Pat. Off. .
58-21863  2/1983  Japan .

(List continued on next page.)

OTHER PUBLICATIONS

Patent Abstracts of Japan, vol. 14, No. 349 (P–1084) 27 Jul. 1990 and JP–A–02 124 538 (Fujitsu) 11 May 1990.
Proceedings of the S.I.D. vol. 29, No. 3, 1988, pp. 217–220, New York, US; K. Oki et al.: "A New Active–Matrix LCD Architecture for Larger–Size Flat Displays".
Proceedings of the S.I.D. vol. 26, No. 3, 1985, pp. 201–207, Hartsdale, N.Y., US; S. Bisotto et al.: "Using Redundancy when Designing Active–Matrix–addressed LCDs" pp. 201–203.
Conference Record of the 1985 International Display Research Conference 15–17 Oct. 1985, pp. 27–29, San Diego, Calif., US; T. Saito et al.: "A High Picture Quality LC–TV using Triangle Trio–Color Dots Addressed by a Si TFTs", (whole document).

*Primary Examiner*—Robert J. Pascal
*Assistant Examiner*—Michael B. Shingleton
*Attorney, Agent, or Firm*—Nixon & Vanderhye

[57] ABSTRACT

An active matrix display device which includes a first and a second insulating substrates, a gate bus an adjacent gate bus, and a source bus arranged on the first substrate, a pixel electrode in a segment enclosed by the gate and the source buses, a switching element connected to the pixel electrode, the gate bus and the source bus, wherein the source bus comprises a projection extending toward the pixel electrode so as to be electrically disconnected therefrom, and the adjacent gate bus comprises a projection extending toward the pixel electrode, the source bus being overlaid on the adjacent gate bus projection with an insulating layer sandwiched therebetween, the adjacent gate bus projection being provided with an electroconductive member at the top thereof with an insulating layer sandwiched therebetween, the electroconductive member being electrically connected to the pixel electrode, and electrically disconnected from the source bus projection.

3 Claims, 9 Drawing Sheets

U.S. PATENT DOCUMENTS

| | | | |
|---|---|---|---|
| 4,775,861 | 10/1988 | Saito | 340/784 |
| 4,890,097 | 12/1989 | Yamashita et al. | 359/59 |
| 4,955,697 | 9/1990 | Tsukada et al. | 340/784 C1 |
| 5,062,690 | 11/1991 | Whetten | 359/59 |
| 5,076,666 | 12/1991 | Katayama et al. | 359/59 |
| 5,087,113 | 2/1992 | Sakono et al. | 359/59 |
| 5,102,361 | 4/1992 | Katayama et al. | 445/4 |
| 5,121,236 | 6/1992 | Ukai et al. | 359/59 |

FOREIGN PATENT DOCUMENTS

| | | | |
|---|---|---|---|
| 59-101693 | 6/1984 | Japan . | |
| 62-22455 | 1/1987 | Japan . | |
| 64-48037 | 2/1989 | Japan . | |
| 0048037 | 2/1989 | Japan | 359/59 |
| 8705141 | 8/1987 | WIPO . | |

1

FAULT TOLERANT ACTIVE MATRIX DISPLAY DEVICE

This is a continuation of application Ser. No. 08/408,061, filed Apr. 19, 1993, now abandoned; which is a continuation of Ser. No. 07/706,974, filed May 29, 1991, now abandoned.

BACKGROUND OF THE INVENTION

1. Field of the Invention

The present invention relates generally to an active matrix display device, and more particularly to an active matrix display device in which switching elements such as thin film transistors apply drive signals to pixel electrodes arranged in a matrix so as to achieve a high density display.

2. Description of the Prior Art

In the known liquid crystal display devices, EL displays devices, plasma display devices, etc. the pixel electrodes arranged in a matrix are selectively driven so as to represent a pattern on a screen. The pixel electrodes are individually provided with switching elements through which the pixel electrodes are selectively driven. This is commonly called an active matrix driving system. The switching elements are made of a thin film transistor (TFT), a metal-insulator metal (MIM), a MOS transistor, a diode and a varistor. A voltage applied between the individual pixel electrodes and counter electrodes is switched on, and a liquid crystal, an EL light emitting medium, a plasma light emitting device make the display medium optically modulated. The optical modulation is observed as displayed patterns by the naked eye. The active matrix display device is suitable for display in high contrast, and finds application in liquid crystal television, word processors, and terminal display units of computers.

FIGS. 9 and 10 show known types of active matrix liquid crystal display devices. One of a pair of substrates has gate buses 21 arranged transversely and source buses 23 perpendicular to the gate buses Every rectangular segment enclosed by the adjacent gate buses 21 and the source buses 23 have pixel electrodes 41.

A gate bus branch 22 branched off from the gate bus 21 has a TFT 31 as a switching element. The gate bus branch 22 includes a first section which functions as a gate electrode for the TFT 31, and a second section which is narrower than the first section. A drain electrode 33 of the TFT 31 is electrically connected to the pixel electrodes 41, and a source electrode 32 is connected to the source bus 23.

FIG. 10 shows another known example in which a source bus branch 90 branched from the source bus 23 overlaps the gate bus 21, and a TFT 31 is formed on the overlapping part. A drain electrode 33 of the TFT 31 is electrically connected to the pixel electrodes 41, and a source electrode 32 is electrically connected to the source bus 23 through the source bus branch 90.

Under this arrangement of the known active matrix display device a problem arises, for example, if any switching element malfunctions, the pixel electrodes connected thereto receives no signal. This appears as devoid of a pixel electrode. The absence of a pixel electrode spoils the representation of the display device. This results in a lower manufacturing yield.

Such faulty or defective pixel electrodes occurs for the following two reasons:

(1) The pixel electrodes are not fully charged until the switching elements are selected by a scanning signal (signals from the gate bus) (hereinafter referred to as "on fault"), and (2) An electric leakage occurs through the charged pixel electrodes before the switching elements are selected (hereinafter referred to "off fault").

The "on fault" occurs owing to a defective switching element. The "off fault" occurs for a further two reasons; one is an electrical leakage through the switching element, and the other is an electrical leakage between the pixel electrodes and the buses. In either case, the voltage to be applied between the pixel electrodes and the counter electrode does not reach a required value. This causes faulty pixel electrodes to look like luminous points under the normal white mode (a mode in which the optical transmissibility reaches the maximum when the voltage applied to the liquid crystal is zero), and looks like a black point under the normal black mode (a mode in which the transmissibility is lowest when the voltage reaches zero).

If these faults are found during the fabrication of a substrate in which the switching elements are arranged, they can be trimmed by laser. In fact, however, it is almost impossible to find a single faulty one in a great number of pixel electrodes. The mass production of substrates cannot be carried out without increasing costs and prolonging the time. It is completely impossible to do so in a large size display panel having 100,000 to 500,000 pixel electrodes.

It is possible to visually observe a faulty pixel electrode by overlaying a counter substrate on a substrate in question, injecting liquid crystal therebetween and applying an inspection signal to the source bus. This method requires a correction in which the source bus and the pixel electrodes are short-circuited so as to effect the charge and discharge of the pixel electrodes by a signal voltage irrespective of whether the source bus was selected or not. In the example shown in FIGS. 9 and 10, it is inherently difficult to do such a correction because of the arrangement of the source bus 23 and the pixel electrodes 41. After all, the display device containing the faulty pixel electrodes has to be discarded even if other components and elements are in good condition. This is wasteful, and increases the production cost. This accounts for the decreased manufacturing yield.

SUMMARY OF THE INVENTION

The active matrix display device of this invention, which overcomes the above-discussed and numerous other disadvantages and deficiencies of the prior art, comprises a first insulating substrate and a second insulating substrate, a gate bus and a source bus arranged on the first insulating substrate in the form of a lattice, a pixel electrode arranged in a segment enclosed by the gate bus and the source bus, a switching element connected to the pixel electrode, the gate bus and the source bus, wherein the source bus comprises a projection extending toward the pixel electrode in such a manner as to be electrically disconnected from the pixel electrode, and the gate bus comprising a projection extending toward the pixel electrode, the source bus being overlaid on the gate bus projection with an insulating layer sandwiched therebetween, the gate bus projection being provided with an electroconductive member at the top thereof with an insulating layer sandwiched therebetween, the electroconductive member being electrically connected to the pixel electrode, and electrically disconnected from the source bus projection.

Alternatively, an active matrix display device comprising a first insulating substrate and a second insulating substrate, a gate bus and a source bus arranged on the first insulating substrate in the form of a lattice, a pixel electrode arranged in a segment enclosed by the gate bus and the source bus, a switching element connected to the pixel electrode, an additive capacitance bus formed under the pixel electrode with an insulating layer sandwiched therebetween, wherein the source bus comprises a projection extending toward the pixel electrode in such a manner as to be electrically disconnected from the pixel electrode, and the additive capacitance bus comprises a projection extending toward the pixel electrode, the source bus being overlaid on the additive capacitance bus projection through an insulating layer, the source bus projection being provided with an electroconductive member at the top thereof with an insulating layer sandwiched therebetween, the electroconductive member being electrically connected to the pixel electrode and electrically disconnected from the source bus projection.

Alternatively, an active matrix display device comprising a first insulating substrate and a second insulating substrate, a gate bus and a source bus arranged on the first insulating substrate in the form of a lattice, a pixel electrode arranged in a segment enclosed by the gate bus and the source bus, a switching element connected to the pixel electrode, a part of the pixel electrode being overlaid on an adjacent gate bus so as to form an additive capacitance together with the gate bus with an insulating layer sandwiched therebetween, wherein the source bus is provided with a projection extending toward the pixel electrode in such a manner as to be electrically disconnected from the pixel electrode, and the gate bus being provided with a projection extending toward the pixel electrode, and the source bus being overlaid on the gate bus projection through an insulating layer, the gate bus projection being provided with an electroconductive member, the electroconductive member being electrically connected to the pixel electrode and electrically disconnected from the source bus projection.

In a preferred embodiment, wherein the switching element is a thin film transistor.

Alternatively, an active matrix display device comprising a first insulating substrate and a second insulating substrate, a gate bus and a source bus arranged on the first insulating substrate in the form of a lattice, a pixel electrode arranged in a segment enclosed by the gate bus and the source bus, switching elements connected to the pixel electrode, gate bus and the source bus, wherein the source bus comprises a projection extending toward the pixel electrode in such a manner as to be electrically disconnected from the pixel electrode, and the gate bus comprises a projection extending toward the pixel electrode and whose top end reaches toward a forward end of the source bus projection, the switching element being formed toward the base end of the gate bus projection, a middle portion of the gate bus projection being overlaid on the source bus projection with an insulating layer sandwiched therebetween, the gate bus projection being provided with an electroconductive member at the top thereof through an insulating layer, the electroconductive member being electrically connected to the pixel electrode.

Alternatively, an active matrix substrate comprising insulating substrates, pixel electrodes arranged in a matrix on the insulating substrates, the pixel electrodes being divided into split pixel electrodes, at least two source buses arranged in parallel between adjacent split pixel electrodes so as to transmit the same signals, the gate bus crossing the source bus and overlaying a part of the pixel electrode, gate bus branches branched from the gate bus, switching elements formed on the gate bus branches and connected to the adjacent split electrodes, connection lines electrically connecting the source buses, the connection lines crossing the gate bus branches with an insulation interposed therebetween.

In a preferred embodiment, the switching element is a thin film transistor.

Alternatively, an active matrix display device comprises a pair of insulating substrates, pixel electrodes arranged in a matrix on one of the substrates, gate buses and source buses crossing each other between the pixel electrodes, scanning branches branched from the gate buses, switching elements formed at top ends of the scanning branches and connected to the pixel electrodes, gate bus projections extending from the gate buses adjacent to those electrically connected to the pixel electrodes toward the corners of the pixel electrodes, source bus projections extending from the source buses adjacent to those electrically connected to the pixel electrodes toward the corners of the pixel electrodes, and electroconductive members overlaid on the ends of the gate bus projections through insulating layers and electrically connected to the pixel electrodes.

In a preferred embodiment, the gate bus branches comprise a larger end portion and smaller portion other than the end portion.

Thus, the invention described herein makes possible the objectives of (1) providing an active matrix display device which can detect and correct any faulty pixel electrodes by a simple procedure after all pixel electrodes are driven, (2) providing an active matrix display device which can be produced at low costs with a high manufacturing yield, and (3) providing an active matrix display device which can correct any faulty pixel electrodes without reducing the aperture ratio of the display panel.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
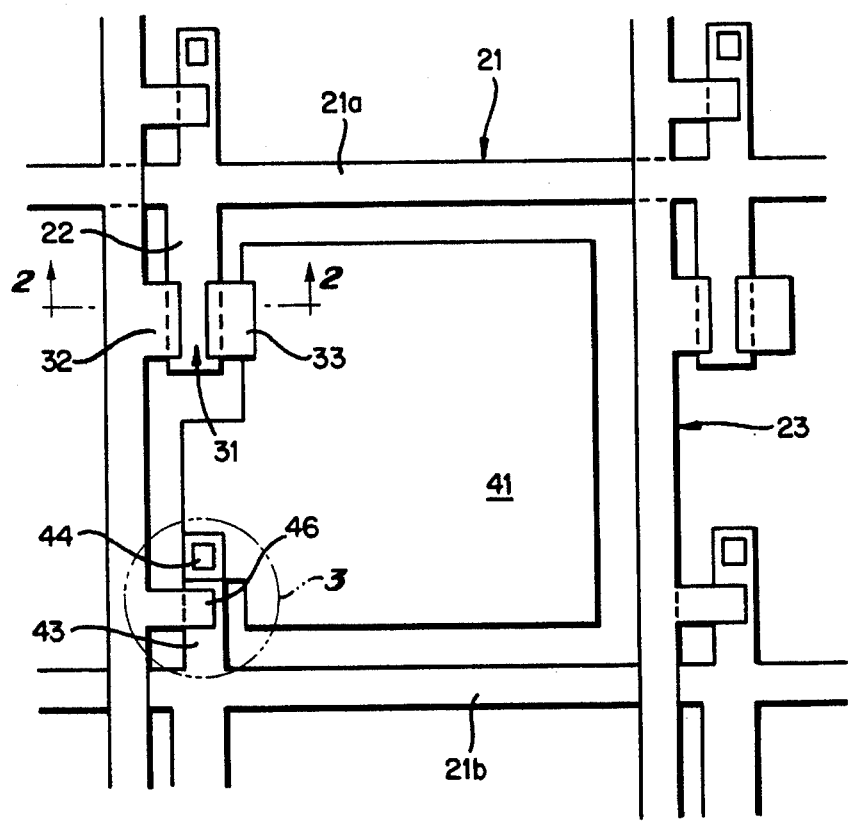
FIG. 1 is a plan view showing an active matrix display device according to the present invention.
Figure 2:
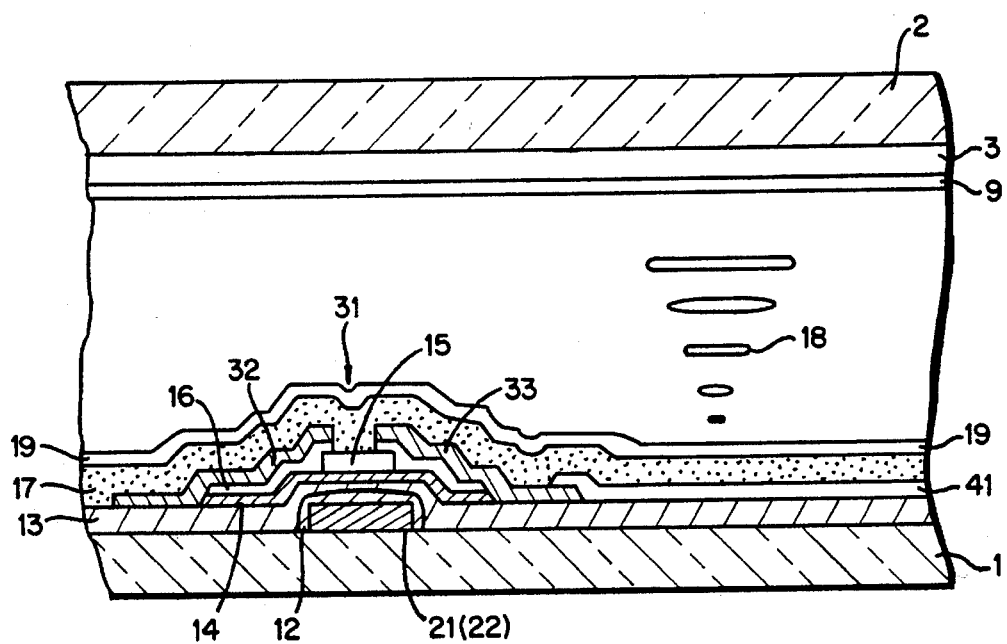
FIG. 2 is a cross-sectional view taken along the line A—A in FIG. 1.
Figure 3:
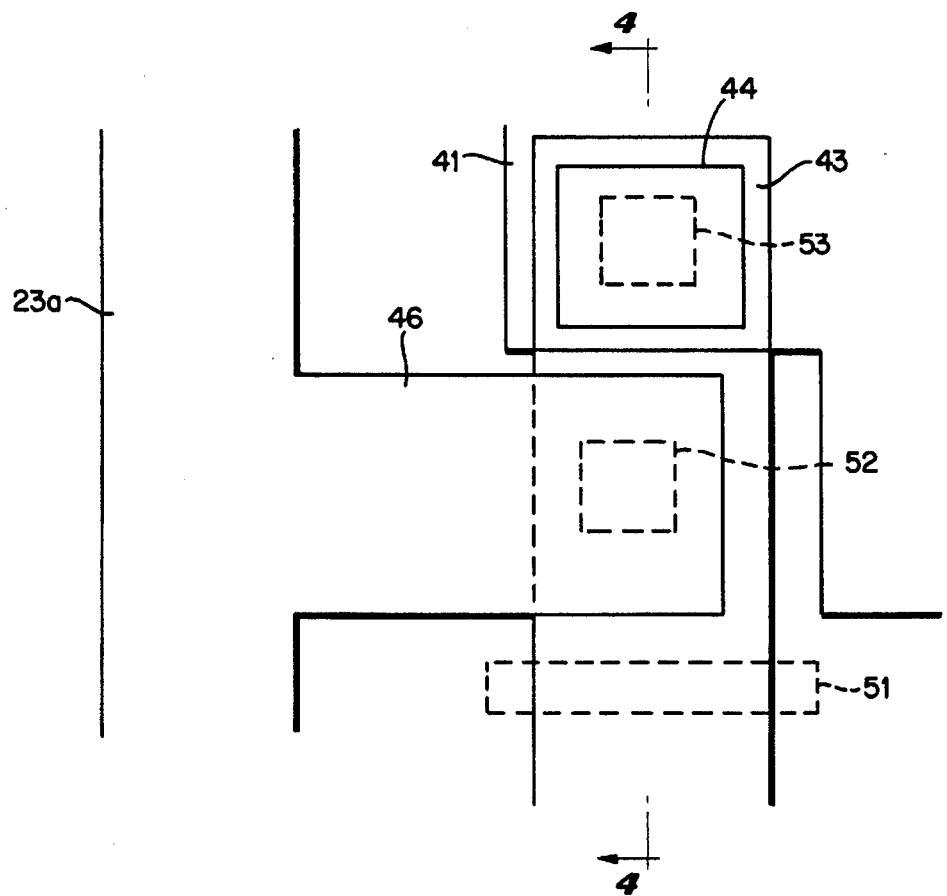
FIG. 3 is a fragmentary plan view on an enlarged scale showing the active matrix display device shown in FIG. 1.
Figure 4:
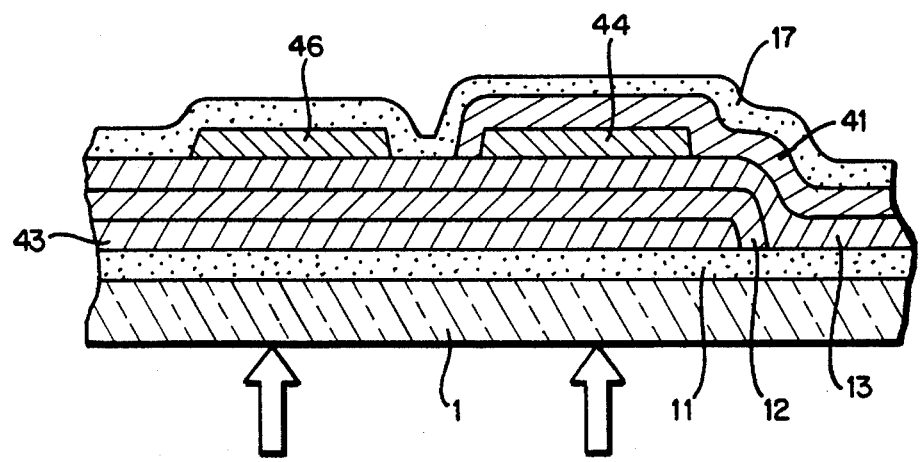
FIG. 4 is a cross-sectional view taken along the line C—C in FIG. 3.

Referring to FIGS. 1 to 4, a display panel includes a lower transmissive insulating substrate 1 and an upper transmissive insulating substrate 2 disposed with a liquid crystal 18 sandwiched therebetween. The lower substrate 1 is provided with a plurality of gate buses 21 for scanning buses, a plurality of source buses 23 so that each rectangular section enclosed by the buses 21 and 23 has pixel electrodes 41 arranged in a matrix. The gate bus has a branch line 22 which is provided with a TFT 31 at its top end. The TFT 31, functioning as a switching element, is connected to the pixel electrodes 41. In FIG. 1, a gate bus 21b adjacent to a gate bus connected to the pixel electrodes 41 is provided with a gate bus projection 43 extending inward from the corner of the pixel electrodes 41. The projection 43 is provided with an electroconductive member 44 through a gate insulating film 13 (FIGS. 3 and 4).

The source bus 23 is also provided with a source bus projection 46 in correspondence with the corners of the pixel electrodes 41. The source bus projection 46 overlays the gate bus projection 43 through the gate insulating film 13.

A process of fabricating the display panel will be described in detail:

The gate bus 21 is formed on the transmissive insulating substrate 1 in a known manner. For example, metal such as Ta, Ti, Al or Cr is deposited either as a single layer or as multi-layers on the transmissive insulating substrate, and then the layer or layers are patterned. Simultaneously, the gate bus branch 22 and the gate bus projection 43 are patterned. In this example, the insulating substrates 1 are made of glass (in the drawings, one substrate along is shown for explanation convenience). It is possible to form an insulating film 11 of $Ta_2O_5$ or the line as a base coat as shown in FIG. 4.

Then, the gate insulating layer 13 is overlaid on the gate bus 21 (including the gate bus branch 22 and the gate bus projection 43). In this example, an $SiN_x$ film was formed to a thickness of 300 nm by a plasma CVD as the insulating layer 13. Alternatively, it is possible to form an oxidized layer of $Ta_2O_5$ by anodizing the gate bus 21 prior to the formation of the gate insulating layer 13.

A semiconductor layer 14 and an etching stopper layer 15 are successively formed on the gate insulating layer 13 by a plasma CVD method. The semiconductor layer 14 is made of amorphous silicon (a-Si) to a thickness of 30 nm, and the etching stopper layer 15 is made of $SiN_x$ to a thickness of 200 nm. The etching stopper layer 15 is patterned, and an $n^+$ type a-Si layer 16 with phosphorus is deposited to a thickness of 80 nm by the plasma CVD method. The $n^+$ type a-Si layer 16 is formed to enhance the ohmic contact between the semiconductor layer 14 and a source electrode 32 or a drain electrode 33 (FIG. 2) which will be deposited at a later stage.

Then, the $n^+$ type a-Si layer 16 is patterned, and a source metal such as Ti, Al, Mo, or Cr is deposited by sputtering. In this example, Ti was used. The Ti layer is patterned so as to form the source electrode 32 and the drain electrode 33. The finished thin film transistor (TFT) 31 is illustrated in FIG. 2. At this stage, as shown in FIG. 4, the source bus projection 46 and the electroconductive member 44 are simultaneously formed.

The next step is to deposit a transmissive insulating substance for the pixel electrodes 41. In this example, ITO (indium tin oxide) was deposited by sputtering and patterned so as to form the pixel electrodes 41, which, as referred to above, is formed in the rectangular section enclosed by the gate bus 21 and the source bus 23. As shown in FIG. 2, the end portion of the pixel electrodes 41 is overlaid on an end portion of the drain electrode 33 of the TFT 31. More specifically, as shown in FIG. 3, it is deposited on the electroconductive member 44. In this way, energizing is effected through the pixel electrodes 41, the drain electrode 33 of the TFT 31 and the electroconductive member 44.

The whole surface of the glass substrate 1 is covered with a protective layer 17 of $SiN_x$. The protective layer 17 can be provided with a hole at a central part of the pixel electrodes 41. An orientation layer 19 is formed on the protective layer 17. The orientation layer 19 can be also provided with a hole at its center. As shown in FIG. 2, a counter electrode 3 and an orientation layer 9 are formed on the glass substrate 2. The reference numeral 18 denotes a liquid crystal sandwiched between the pair of insulating substrates 1 and 2. In this way an active matrix display device is finished.

A method of correcting a faulty pixel electrode will be described:

The pixel electrodes 41 are driven by the TFT 31 unless the TFT 31 is in abnormal condition, and the pixel electrodes 41 in the segment enclosed by the gate bus 21 and the source bus 23 are put into regular operation. No problem arises on the display. If any abnormality occurs in the TFT 31 or a weak electric leak occurs between the source bus 23 and the pixel electrodes 41, the pixel electrode becomes faulty, and the result appears on the display. This faulty pixel electrode is corrected in the following manner:

First, the active matrix display device is driven so as to confirm the faulty pixel electrode. As shown in FIG. 3, if any abnormality is discovered, a segment 51 enclosed by dotted lines is irradiated with photo energy such as YAG laser beams so as to disperse the metal molecules in this segment 51. In this way the gate bus 21 and the gate bus projection 43 are electrically disconnected from each other. Then a segment 52 enclosed by dotted lines is irradiated with laser beams so as to destroy the insulating layer 13 between the source bus projection 46 and the gate bus projection 43. Thus the two projections 46 and 43 are melted, thereby enabling them to electrically communicate with each other.

The laser beams can be irradiated either from the side of the insulating substrate 1 on which the TFT 31 is formed or from the side of the substrate 2 on which the counter electrode is provided. In this example, the laser beams are irradiated from the side of the substrate 1 because of the coverage of the substrate 2 with a light shield metal. In FIG. 4, the directions of laser beams are indicated by white thick arrows.

Second, laser beams are irradiated upon the segment 53, where the gate bus projection 43 and the electroconductive member 44 overlap each other. This irradiation destroys the insulating layer 13, thereby enabling the gate bus projection 43 and the electroconductive member 44 to electrically communicate by fusing. The two irradiations of laser beams enable the upper and lower metal wirings to electrically communicate in the segments 52 and 53, respectively. In this way the source bus 23 and the electroconductive members 44, that is, the pixel electrodes 41 are short-circuited.

Because of the short-circuit the faulty pixel is lit at an average brightness achieved by all the normal pixels, thereby avoiding a faulty display.

The gate bus branch 22 and the TFT 31 are covered with the protective layer 17, thereby preventing a molten metal molecules from admixing with the liquid crystal 18. This avoids the deterioration of the liquid crystal 18.

The irradiation of laser beams can be in various order for the segments 51, 52, and 53 as desired. Besides, the spots of irradiation need not be limited to the illustrated ones but any desired spots can be selected; for example, in the segments 52 and 53 any desired spots can be selected if they are within the overlapping portions of the upper and lower electroconductive layers.

Figure 5:
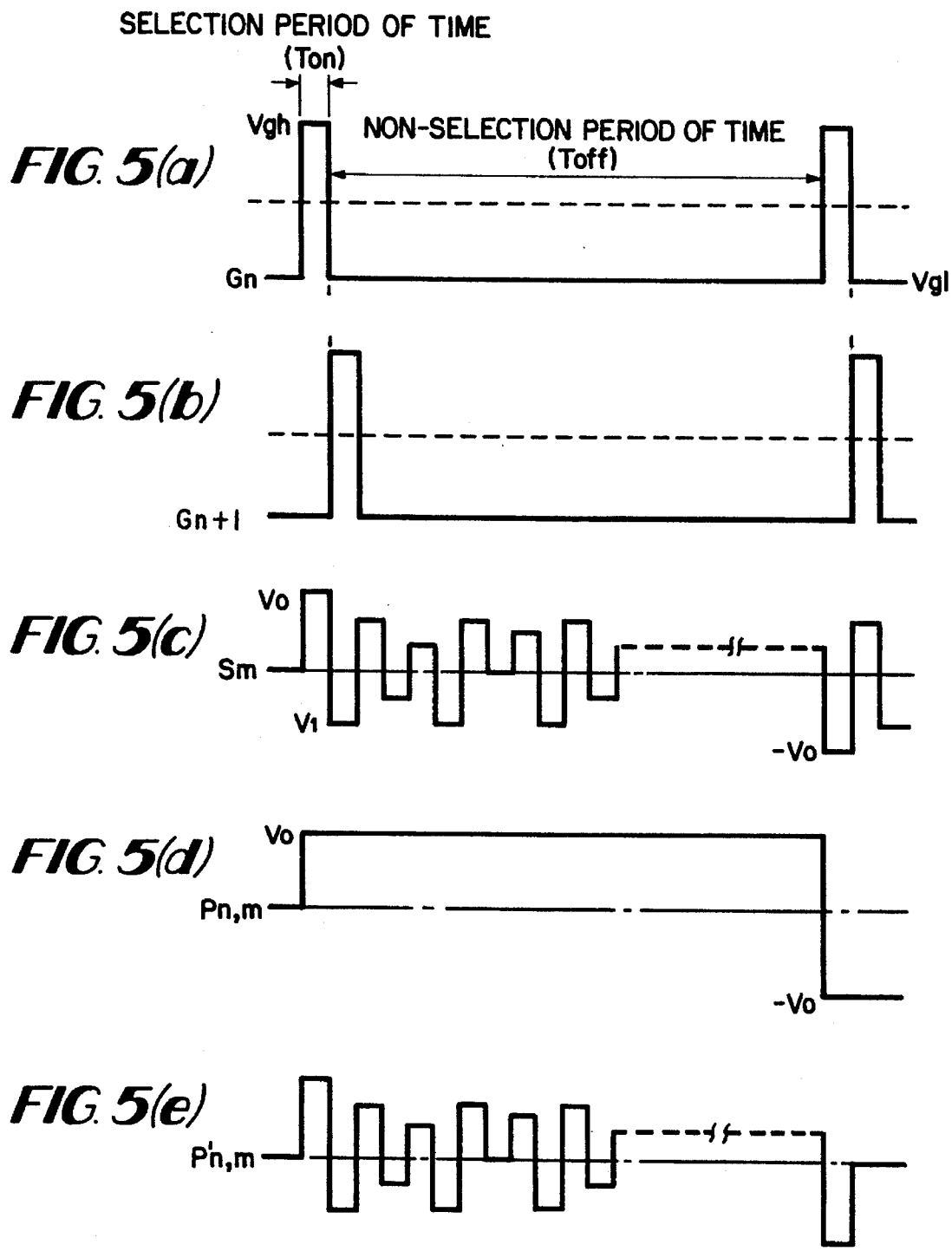
FIG. 5 is a timing chart showing the signals input to the gate bus, source bus and pixel electrodes.

Referring now to FIG. 5, explanation will be given as to how the TFT is operated when the pixel electrodes 41 and the source bus 23 are short-circuited:

In FIG. 5, $G_n$ is a signal (voltage signal) from the (n)th gate bus 21, $S_m$ is a signal from the (m)th source bus 23, $P_{n,m}$ is a signal given to pixel electrodes 41 present at the junction of the (n)th gate bus 21 and the (m)th source bus 23.

As shown in FIG. 5(a), when the potential of the signal from the gate bus 21 is Vgh (at a high level), the TFT 31 is selected, and when it is Vgl (at a low level), the TFT 31 is not selected. As shown in FIG. 5(c), when the TFT 31 is selected, a pulse signal V0 is charged in the pixel electrodes 41. When the pixel electrode 41 is in a normal operation, the signal V0 is held for a period of time Toff when the TFT 31 is not selected, and a signal −V0 is written in the source bus 23 at a point of time Ton when the TFT 31 is selected.

In FIG. 5(b) the reference signal Gn+1 denotes a signal applied to the (Gn+1)th gate bus 21. This signal Gn+1 is selected when the period of time Ton for selecting the gate bus 21 expires. At this time the signal −V1 is written in the source bus 23 (FIG. 5(c)). As is evident from FIGS. 5 (a) and 5(b), the signals applied to the gate bus 21 are consecutively delayed in the order of the line number, and the non-selection period of time continues over the period of time Toff until the (n)th gate bus 21 is selected. During the non-selective period of time signals to be written in the pixel electrodes 41 are continuously applied to the source bus 23.

As shown in FIG. 5(d), the pixel electrodes 41 that are in normal condition are charged in response to the signal Sm input from the source bus 23 when the gate signal Gn is selected, thereby changing the molecular arrangement of the liquid crystal 18 at an electric potential between the counter electrode 3 on the substrate 2 and the liquid crystal 18. In this way the display is effected. At this stage, the signals Sm input to the source bus 23 during the non-selection period of time Toff do not contribute to the display at all.

When the pixel electrodes 41 and the source bus 23 are short-circuited by the irradiation of laser beams, the pixel electrodes 41 are subjected to electrical charging or discharging in response to all the signals Sm input from the source bus 23 irrespective of the selection and non-selection of the gate bus 21, wherein the signal is indicated by P'n,m in FIG. 5(e). The pixel electrode 41 that was corrected by the irradiation of laser beams receives the signal Sm directly from the source bus 23 during the non-selection period of time Toff. Thus, the voltage is applied to the liquid crystal 18 at its effective value. Except when the signals Sm applied to the source bus 23 becomes V0, the effective value of the signal P'n,m cannot be V0, but the effective value of the signal voltage P'n,m is an average value of all the pixel electrodes 41 connected to the (m)th source bus 23. This means that the display device is lit at an average brightness of the pixel electrodes 41 arranged along the (m)th source bus 23. Each pixel electrode is lit at such a sufficient brightness so as to maintain the quality of representation on the screen.

Figure 6:
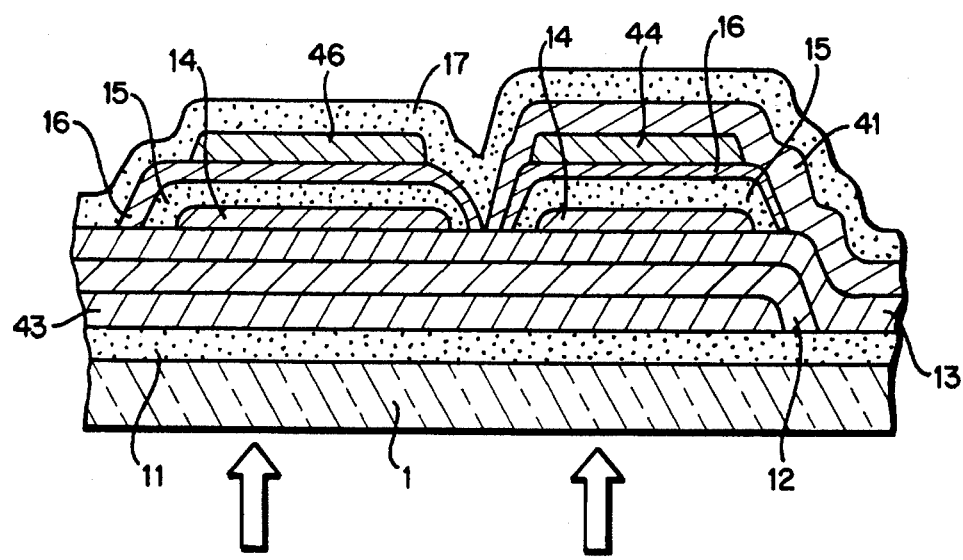
FIG. 6 is a cross-sectional view showing a modified version of the present invention.

FIG. 6 shows a modified version which includes a semiconductor layer 14, an etching stopper layer 15 and a contact layer 16 between the gate insulating layer 13 and an electroconductive member 44, and between the gate insulating layer 13 and the source bus projection 46, respectively. These layers 14 to 16 are provided to electrically disconnect the upper electroconductive layers from the lower electroconductive layers, and vice versa. Instead of these layers 14 to 16, the semiconductor layer 14 and the etching stopper 15, or the contact layer 16 alone can be inserted.

Figure 7:
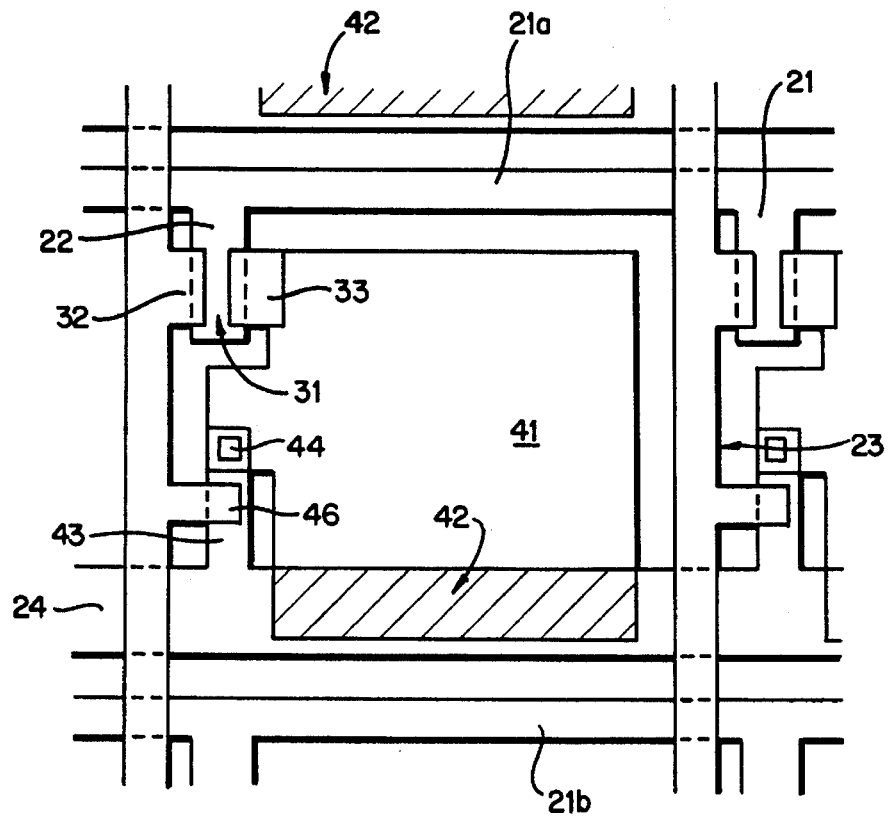
FIG. 7 is a plan view showing another example of the present invention.

FIG. 7 shows a further modified version in which each pixel electrode 41 has an additive capacitance 42 which is constituted by an additive capacitance bus 24 arranged in parallel with the gate bus 21 and the gate insulating layer 13. More specifically, the gate bus 21 is overlaid on the pixel electrodes 41, and the additive capacitance 42 is formed on the overlapping portion as shown by hatching in FIG. 7. The additive capacitance bus 24 is formed by depositing the same metal as that of the gate bus 21, and patterning simultaneously when the gate bus 21 is patterned.

This example shown in FIG. 7 is constructed so that the same signal is input to the additive capacitance bus 24 as the counter electrode 3. As a circuit the additive capacitance 42 is in parallel with the capacitance of the liquid crystal 18. The additive capacitance 42 maintains the charge of the pixel electrodes 41, thereby enhancing the performance of the display device. In this example, the faulty pixel can be corrected in the same manner as described above.

Figure 8:
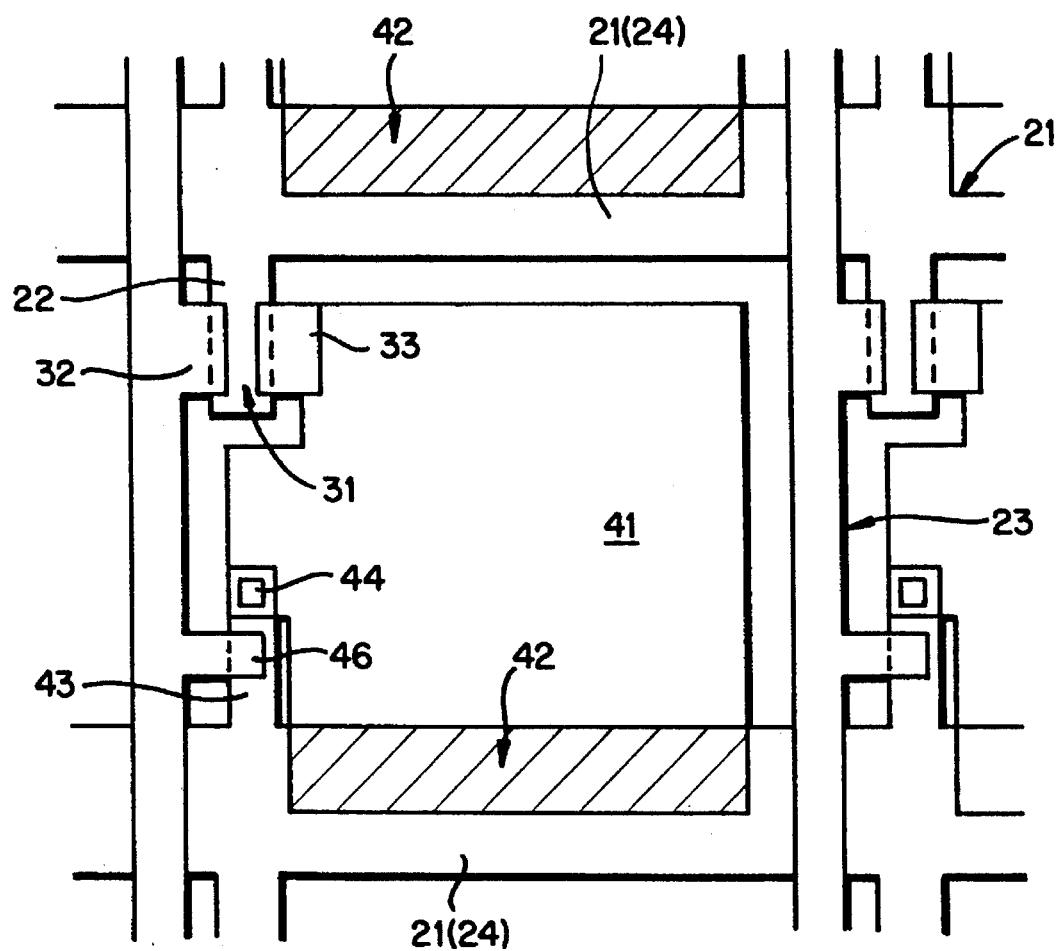
FIG. 8 is a plan view showing another example of the present invention.
Figure 9:
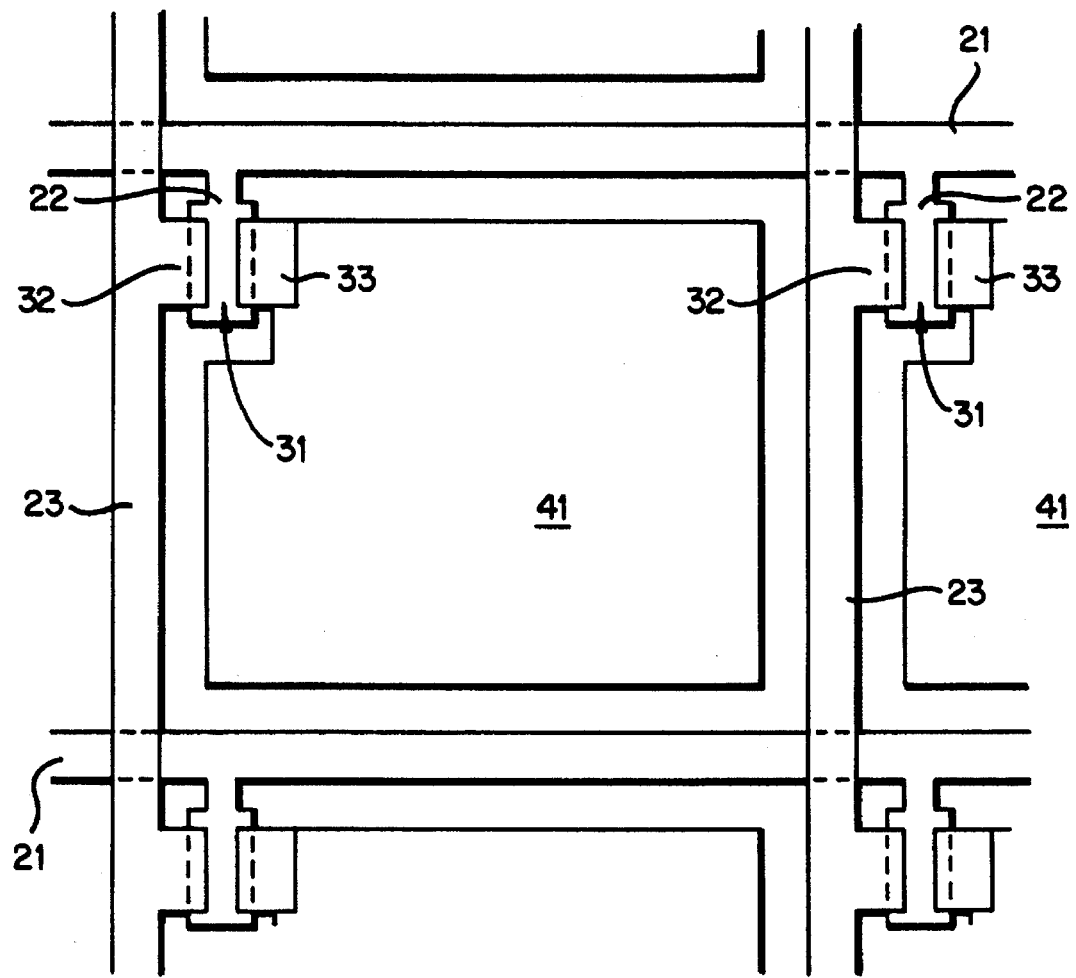
FIG. 9 is a plan view showing an example of a prior art active matrix display device.
Figure 10:
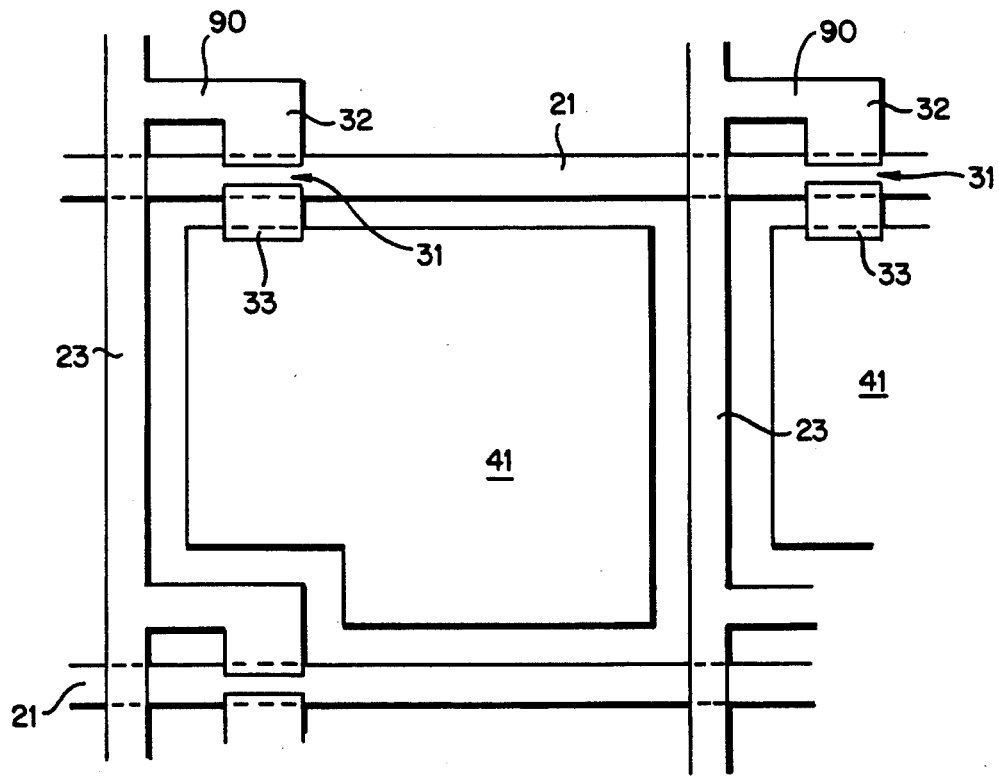
FIG. 10 is a plan view showing another example of a prior art active matrix display device.

FIG. 8 shows another modified version in which the additive capacitance 42 is formed on the adjacent gate bus 21. More specifically, the additive capacitance bus 24 is overlaid on the gate bus 21, and the additive capacitance 42 is formed on an overlapping portion of the pixel electrodes 41 and the gate bus 21 through the gate insulating layer 13 as shown by hatching in FIG. 8. When the adjacent gate bus 21 is not selected, the same signal is input to the gate bus 21 as that applied to the counter electrode 3 on the glass substrate 2. This gate bus 21 is used as the additive capacitance bus 24. This decreases the light shading area, thereby avoiding a dark image picture. Thus the display performance is enhanced.

In the illustrated embodiments the TFTs are used as switching elements, but an MIM element, a MOS transistor, a diode or a varistor can be used. The TFT is not limited to the illustrated structure but can be variously modified; for example, a source bus can be placed as a lower layer, and a gate bus can be placed as an upper layer.

Figure 12:
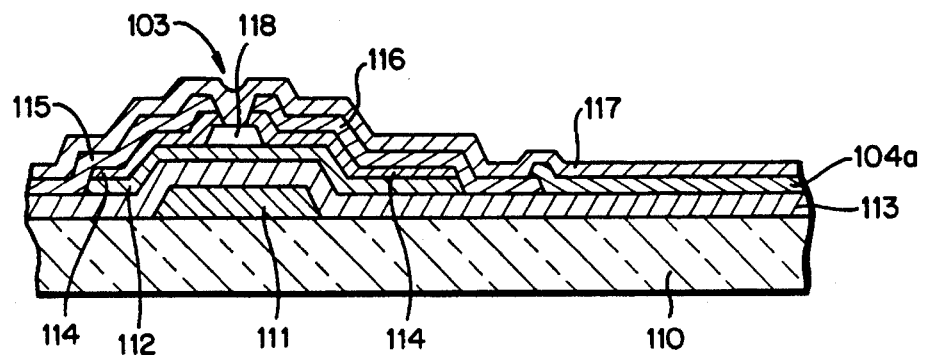
FIG. 12 is a cross-sectional view taken along the line II—II in FIG. 11.
Figure 11:
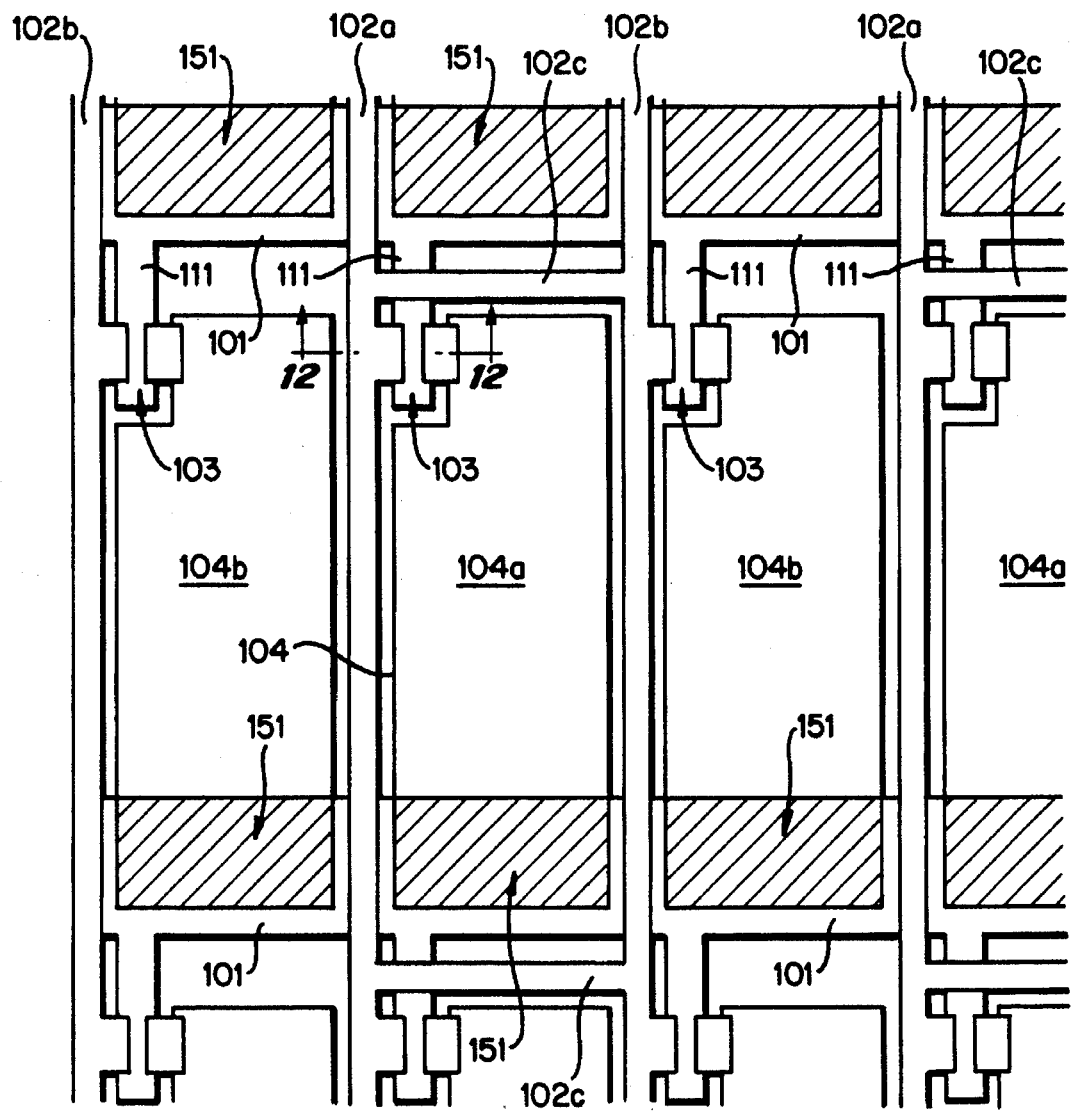
FIG. 11 is a plan view showing a substrate used in an active matrix display according to the present invention.

Referring to FIGS. 11 and 12, an active matrix substrate suitable for use in the active matrix display device will be described:

An insulating substrate 110 is provided with pixel electrodes 104 arranged in a matrix, each pixel electrode being divided into two electrodes 104a and 104b, which will be hereinafter referred to as split electrodes, two source buses 102a and 102b, the source buses 102a and 102b passing in parallel between adjacent split electrodes 104a and 104b so as to transmit the same signal, and a gate bus 101 crossing at right angles to the source buses 102a and 102b, the gate bus 101 being overlaid on a part of the pixel electrodes 104, a gate bus branch 111, thin film transistors (TFTs) 103 and a connection line 102c connecting the two source buses 102a and 102b. The connection line 102c crosses the gate bus branch 111 with an insulation interposed therebetween.

The gate bus 101 functions as scanning lines, the source buses 102a and 102b as signal lines, the gate bus branch 111 as scanning branches, and the TFT 103 as a switching element.

The substrate is fabricated as follows:

A Ta layer is formed on the insulating substrate 110 by sputtering, and patterned to form the gate bus 101 and the gate bus branch 111. As referred to above, Ti, Al or Cr can be used instead of Ta. The layer can be single or multiple. It is possible to cover the whole surface of the substrate 110 with an insulating layer of $Ta_2O_5$. The surfaces of gate bus 101 and the gate bus branch 111 can be anodized so as to form an anodized layer. Other parts of the process are the same as those described above. In the illustrated embodiment, one pixel electrode is split into two parts by the two source buses 102a and 102b which transmit the same image signal, but the substrate 110 can be provided with three source buses or more which transmit the same signal. In this case, the three source buses must be mutually connected by use of two or more connection lines. It is not always necessary to provide each pixel electrode with the connecting line 102c but it is sufficient if the source buses 102a and 102b are connected by at least one connecting means.

If any of the source bus 102a or 102b breaks, an image signal is sent by other source buses through the connecting lines 102c so as to enable the image signal to reach beyond the broken point, thereby avoiding the occurrence of troubles due to line breakage. The gate buses 101 constitute additive capacitance electrodes, thereby reducing the area of the pixel electrodes 104 as a whole.

Figure 13:
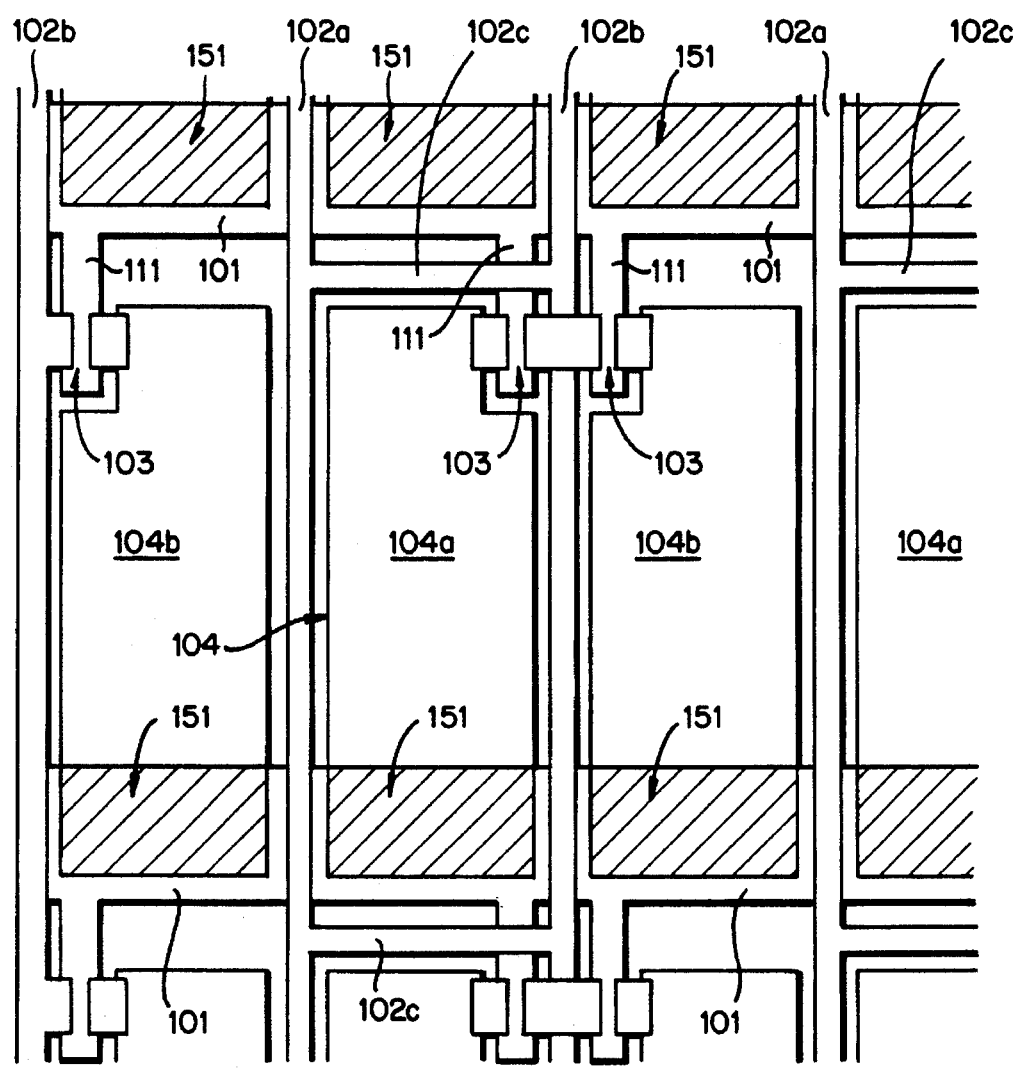
FIG. 13 is a plan view showing other example of the substrate.

FIG. 13 shows a modification to the substrate shown in FIGS. 11 and 12. Two TFTs 103 connected to the split electrodes 104a and 104b are connected to the same source buses 102a or 102b. The other structure is the same as that of FIG. 11. TFTs 103 are connected to the source bus 102a that functions as a bypass.

As is evident from the foregoing description, according to the present invention a faulty pixel can be detected after all the pixel electrodes are driven. In addition, the detection can be easily done by irradiating the display panel with laser beams from outside the insulating substrates. As a result, the manufacturing yield is increased.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display device comprising:

a first insulating substrate and a second insulating substrate;

a gate bus having a branch formed thereon and an adjacent gate bus having a projection formed thereon and a source bus having a first projection formed thereon and a second projection formed thereon, the gate bus, the adjacent gate bus, and the source bus being arranged on the first insulating substrate;

a pixel electrode bordered by the gate bus, the adjacent gate bus, and the source bus;

a switching element which is connected to the pixel electrode, to the branch of the gate bus, and to the first projection of the source bus;

wherein the second projection of the source bus extends toward the pixel electrode, and the projection of the adjacent gate bus extends toward the pixel electrode, the second projection of the source bus being overlaid on the projection of the adjacent gate bus with the insulating layer sandwiched therebetween, the projection of the adjacent gate bus being provided with an electroconductive member at a top end thereof with the insulating layer sandwiched therebetween, the electroconductive member being electrically connected to the pixel electrode; and the display device further comprising a protective layer overlaid at least on the second projection of the source bus and the electroconductive member for containing a release of molten molecules therefrom, wherein the electroconductive member is fused to the projection of the adjacent gate bus through said insulating layer and the second projection of the source bus is fused to the projection of the adjacent gate bus through said insulating layer; and wherein direct electrical communication of the source bus and the pixel electrode is attained, regardless of a voltage on the gate bus, through the fused electroconductive member and the fused second projection of the source bus.

2. An active matrix display device comprising:

a first insulating substrate and a second insulating substrate;

a gate bus, an adjacent gate bus, and a source bus arranged on the first insulating substrate;

a pixel electrode bordered by the gate bus, the adjacent gate bus, and the source bus;

a switching element connected to the pixel electrode, a part of the pixel electrode being overlaid on the adjacent gate bus so as to form an additive capacitance together with the adjacent gate bus with an insulating layer sandwiched therebetween;

wherein the source bus is provided with a projection extending toward the pixel electrode, and the adjacent gate bus being provided with a projection extending toward the pixel electrode, and the projection of the source bus being overlaid on the adjacent gate bus projection with the insulating layer therebetween, the adjacent gate bus projection being provided with an electroconductive member with the insulating layer sandwiched therebetween, the electroconductive member being electrically connected to the pixel electrode;

the display device further comprising protective layer overlaid on the projection of the source bus and the electroconductive member for containing a release of molten molecules therefrom, wherein the projection of the source bus is fused to the projection of the adjacent gate bus and the electroconductive member is fused to the projection of the adjacent gate bus through said insulating layer; and wherein direct electrical communication of the source bus and the pixel electrode is attained, regardless of a voltage on the gate bus, through the fused electroconductive member and the fused second projection of the source bus.

3. An active matrix display device as defined in claim 1, wherein the switching element is a thin film transistor.

\* \* \* \* \*